Figure 1:
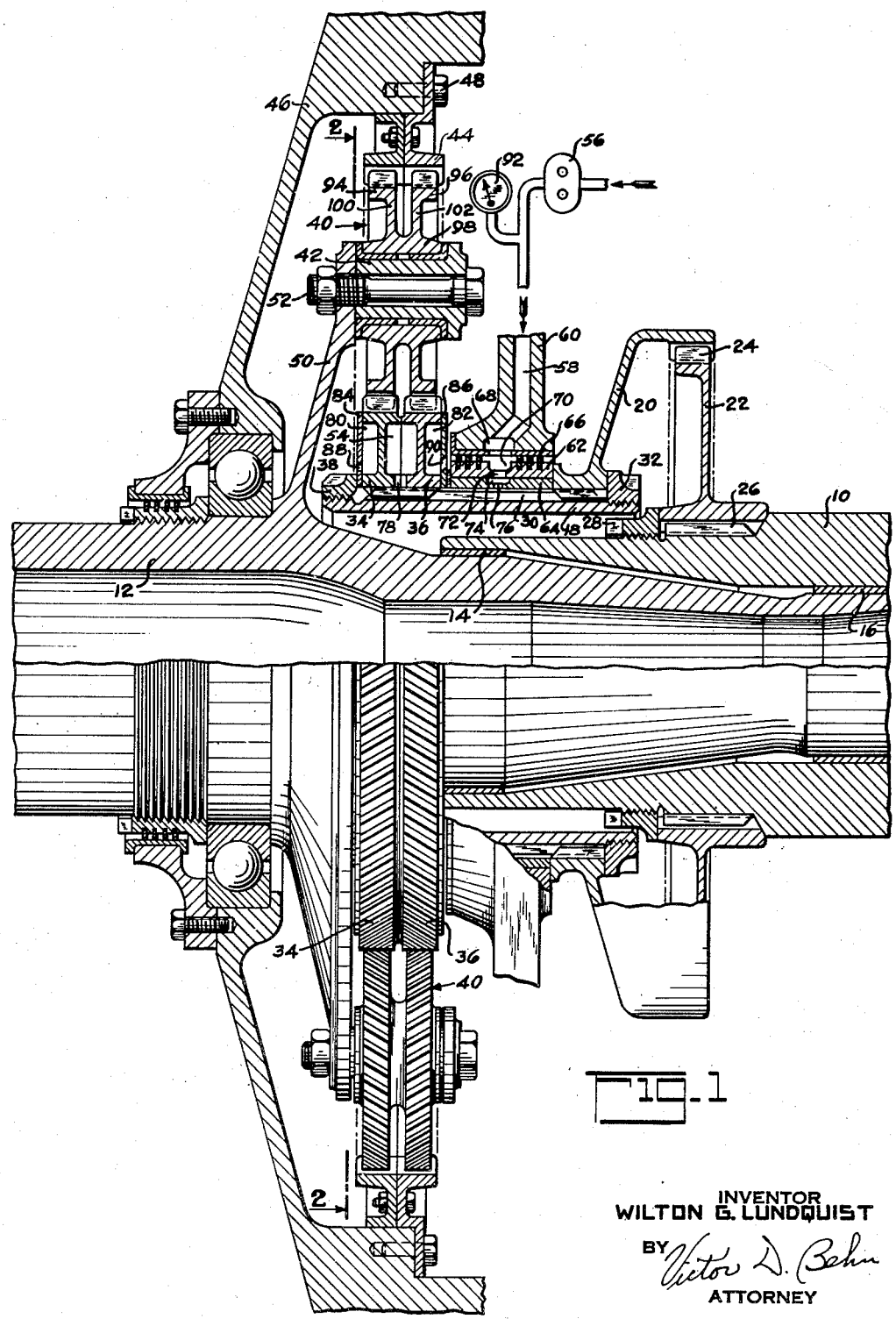

July 27, 1954 W. G. LUNDQUIST 2,684,591
TORQUEMETER

Filed April 26, 1950 2 Sheets-Sheet 1

INVENTOR
WILTON G. LUNDQUIST
BY
ATTORNEY

July 27, 1954

W. G. LUNDQUIST 2,684,591

TORQUEMETER

Filed April 26, 1950

2 Sheets-Sheet 2

INVENTOR
WILTON G. LUNDQUIST
BY
ATTORNEY

Patented July 27, 1954

2,684,591

UNITED STATES PATENT OFFICE 2,684,591

TORQUEMETER

Wilton G. Lundquist, Hohokus, N. J., assignor to Curtiss-Wright Corporation, a corporation of Delaware Original application June 22, 1945, Serial No. 600,967. Divided and this application April 26, 1950, Serial No. 158,252

8 Claims. (Cl. 73—136)

This invention is a division of application Serial No. 600,967, filed June 22, 1945 and subsequently abandoned, and relates to torque measuring means.

It is an object of this invention to provide a novel transmission construction whereby a continuous indication of the transmission torque is obtained without the use of any movable parts in the transmission other than the gears themselves. To this end, the transmission includes a composite herringbone drive gear comprising two helical gear portions disposed in side-by-side relation and providing a fluid chamber therebetween. This fluid chamber is adapted to be vented by axial separation of the rims of said two helical gears. The arrangement is such that upon the transmission of power, the rim portions of said helical gear portions are urged together by the axial thrust on their helical teeth, thereby tending to close the vent for said chamber. Fluid pressure is supplied to said chamber for urging said helical gears apart against said axial thrust such that the pressure within said chamber balances said axial thrust. In this way, the fluid pressure within said chamber is a continuous measure of the transmission torque.

Figure 2:
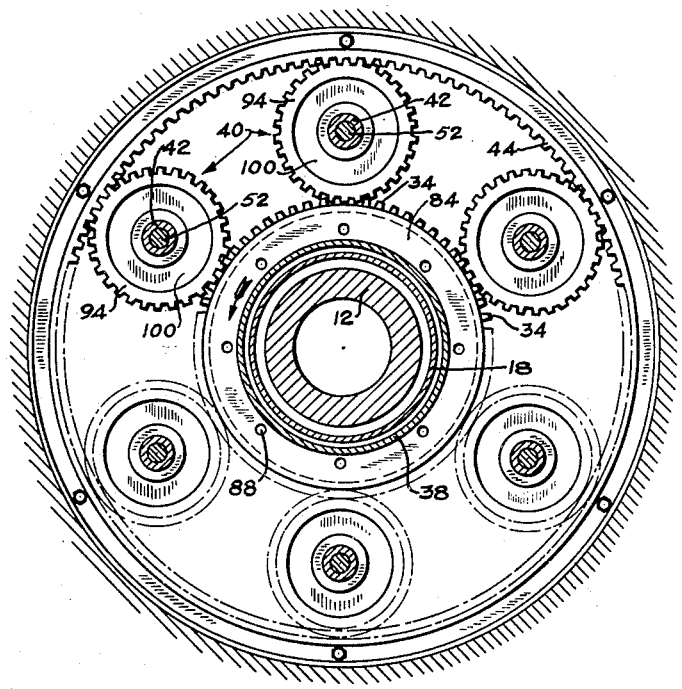

Other objects of the invention will become apparent upon reading the annexed detailed description in connection with the drawing in which:

Figure 1 is an axial view partly in section of a transmission embodying the invention; and Figure 2 is a view taken along line 2—2 of Figure 1.

Referring to the drawing, a shaft 10 is adapted to drive a shaft 12 through a gear transmission embodying the invention, the shaft 12 being piloted within the shaft 10 by bushings 14 and 16. The transmission is of general application—for example, the shaft 10 may comprise part of the crankshaft of an internal combustion engine for aircraft and the shaft 12 may comprise a propeller shaft driven thereby.

Shaft 10 is drivably connected or splined to an intermediate stub shaft 18 through drive members 20 and 22 splined together at 24. The shaft 10 is provided with splines 26 upon which the member 22 is secured by a nut 28 and the intermediate shaft 18 is provided with splines 30 upon which the member 20 is held by a nut 32. The splines 30 extend substantially along the entire length of the shaft 18 and a pair of side-by-side helical gears 34 and 36 are splined thereon and held in place by a nut 38 at the end of the shaft 18 remote from the member 22. The helical gears 34 and 36 have their teeth cut so as to comprise a composite herringbone gear which is in mesh with a plurality of circumferentially spaced herringbone planet pinions 40 journaled about studs 42. The planet pinion gears 40 are also in mesh with a fixed outer herringbone ring gear 44 concentric with the composite herringbone sun gear 34, 36 and secured to the engine crankcase 46 by bolts 48. The propeller shaft 12 is provided with a laterally extending flange 50 to which the various studs 42 are secured by bolts 52. In this way, a drive is provided from the shaft 10 to the shaft 12 through a planetary reduction gear unit.

Helical gears 34, 36 are formed so as to provide an annular chamber 54 therebetween about the shaft 18. The chamber 54 is adapted to be vented by axial separation of the rims of the gears 34 and 36. The gears 34 and 36 each have resilient web portions interconnecting their rim and hub portions to permit axial separation of their rim portions. If desired, the gears 34 and 36 may have a common hub portion.

The direction of rotation of the shaft 18 is such that the gears 34 and 36 rotate counter-clockwise as viewed in the direction in which Figure 2 is taken and as indicated by the arrow in Figure 2. With this direction of rotation, the axial thrust on the helical teeth of gears 34 and 36 urges their rim portions together thereby closing the vent for the chamber 54. A liquid under pressure—for example, engine lubricating oil—is adapted to be supplied to the chamber 54 by a pump 56. The output side of the pump 56 is connected to a passage 58 in an oil transfer bearing diaphragm 60 through which the shaft 18 extends. A floating bushing 62 is fitted between the diaphragm 60 and a bushing 64 secured to the shaft 18 about its splines 30. The bushing 62 is provided with seal rings 66 as illustrated.

Oil under pressure is supplied from the pump 56 through passage 58 to an annular passage 68 in the hub of the diaphragm 60 and thence through an annular passage 70 and radial openings 72 in the floating bushing 62 and then through an annular passage 74 and radial openings 76 in the bushing member 64. From the openings 76, the oil under pressure flows along the splines 30 which are sealed at their ends by nuts 32 and 38. From the splines 30, the oil is supplied to the chamber 54 through openings or slots 78 in the hubs or common hub of helical gears 34 and 36. The pump 56 is designed to have a capacity sufficient to produce a pressure in the chamber 54 capable of at least effecting a slight separation of the rims of gears 34 and 36 against the axial thrust thereon under maximum load conditions.

With this construction, when power is being transmitted from the crankshaft 10 to the propeller shaft 12, and oil pressure is supplied to the chamber 54, the oil pressure therein will cause a slight separation of the rims of helical gears 34 and 36 such that the pressure within the chamber 54 is relieved sufficiently to balance the axial thrust on the helical teeth of gears 34 and 36, which thrust urges the rims of these gears together. This axial thrust is always proportional to the torque being transmitted and therefore, the pressure within the chamber 54 is also always proportional to the transmitted torque.

The chamber 54 is in substantially unrestricted communication with the pump 56 and therefore in the absence of the effect of the centrifugal force acting on the oil within the chamber 54, the output pressure of the pump 56 would be a continuous measure of the transmitted torque. However, the pressure within the chamber 54 is equal to the sum of the pump pressure plus the centrifugal pressure resulting from the rotation of the chamber 54 and gears 34 and 36. The magnitude of the oil pressure caused by the centrifugal force acting thereon is a variable, depending on the rotative speed of gears 34 and 36.

The variable effect of centrifugal oil pressure within the chamber 54 on the axial separation of the rims of gears 34 and 36 is eliminated by providing chambers 80 and 82 on the outside of gears 34 and 36 and rotatable therewith. The arrangement is such that oil accumulates within the chambers 80 and 82 and balances the centrifugal oil pressure on the oil in the chamber 54. To this end, the inner edge of annular plates 84 and 86 are clamped against the hub ends of gears 34 and 36 by the nut 38 and the outer edges of the plates 84 and 86 are disposed adjacent to the rim portions of said gears without any material pressure therebetween during operation to define the chambers 80 and 82 respectively. Oil is permitted to drain or enter the chambers 80 and 82 for example from the splines 30, through restricted passages (not shown) between the plates 84 and 86 and the adjacent gears 34 and 36. The chambers 80 and 82 are respectively vented through relatively large passages 88 and 90 at their radially inner peripheries so that the only oil pressure developed within the chambers 80 and 82 results from the centrifugal force acting on the oil within these chambers. The outer ends of the plates 84 and 86 are disposed sufficiently close to the gears 34 and 36 so that during turbine operation leakage oil flow outwardly between said plates and gears from the chambers 80 and 82 is less than the rate of oil flow into said chambers whereby said chambers remain full of oil. With this construction, centrifugal oil pressure within the chamber 54 is balanced against the centrifugal oil pressure within the chambers 82 and 84. Accordingly, the axial thrust on the helical teeth of gears 34 and 36 is balanced by the pump pressure supplied to the chamber 54. As a result, the output pressure of the pump 56 will vary in proportion to the transmission torque and an oil pressure gage 92 may be calibrated to indicate this torque.

As illustrated, each herringbone planet pinion 40 has a divided construction comprising a pair of spaced rim portions 94 and 96, each carrying a set of helical teeth and respectively connected to a common hub 98 by elastic or resilient webs or flanges 100 and 102. With this construction, when power is being transmitted, in the direction of the arrow in Figure 2, the axial thrust on the teeth of the planet pinions 40 tends to separate their spaced rim portions 94 and 96 against the elasticity or resiliency of their supporting webs 100 and 102. Accordingly, if any one planet pinion tends to carry more than its share of the load, the increased axial thrust on its helical teeth will effect a further separation of its rim portions 94 and 96 in the region of meshing engagement with gears 34 and 36, thereby relieving such one or more planet pinions of some of their load. In this way, the elastic double walled construction of the planet pinions 40 provides for automatic load compensation between these pinions.

At this point it should be noted that as far as the torque measuring means is concerned, the pinions 40 need not have the load compensation construction described. This is so because the friction between the herringbone gear 34, 36 and the pinions 40 resisting axial movements of the rim portions of said herringbone gear is low since said gear and pinions are in continuous rolling and meshing engagement. Furthermore although a planetary transmission has been illustrated the invention obviously is not limited to such a transmission.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In a transmission; first and second herringbone-type gears disposed in meshing engagement and relatively rotatable for transmitting torque; said first gear being rotatable and comprising a pair of toothed portions and a pair of flexible portions supporting said toothed portions for relative axial movement, said toothed portions and the adjacent sides of said flexible portions forming a first chamber therebetween with said toothed portions being movable axially away from each other to provide a vent opening for said chamber between said toothed portions, each of said toothed portions having a set of helical gear teeth meshing with said second gear and sloping in a direction opposite to the helical gear teeth of the other set such that during torque transmission the axial thrusts on said sets of gear teeth urge said toothed portions axially toward each other; means for supplying a liquid under pressure to said first chamber for opposing said axial thrusts; means for forming second and third chambers, one on the remote side of each of said flexible portions; and means for maintaining said second and third chambers full of said liquid for balancing that much of the pressure of the liquid in said first chamber resulting from the centrifugal force acting on the liquid in said first chamber.

2. In a transmission; a herringbone-type gear comprising first and second co-axial and relatively axially movable portions forming a chamber therebetween, each of said gear portions having a set of helical teeth co-axial with and sloping in a direction opposite to the corresponding helical teeth on the other of said portions such that during torque transmission by said gear the axial thrust on each said set of helical teeth urges its associated gear portion axially toward the other gear portion said gear portions having adjacent surfaces forming the walls of a vent passageway for said chamber whereby the flow resistance of said vent passageway increases and decreases as said gear portions move respectively toward and away from each other; and means for supplying a fluid under pressure to said chamber for urging said gear portions axially apart against said axial torque responsive thrusts during torque transmission.

3. In a transmission; a herringbone-type gear comprising first and second co-axial and relatively axially movable portions forming a chamber therebetween, each of said gear portions having a set of helical teeth co-axial with and sloping in a direction opposite to the corresponding helical teeth on the other of said portions such that during torque transmission by said gear the axial thrust on each said set of helical teeth urges its associated gear portion axially toward the other gear portion, there being a variable fluid passage way extending radially between said gear portions into communication with said chamber and having its walls movable with said gear portions to vary the flow resistance of said passageway to control the pressure within said chamber; and means for supplying a fluid under pressure to said chamber for urging said gear portions apart against said axial torque responsive thrusts on said gear portions during torque transmission.

4. In a transmission; a herringbone-type gear comprising first and second co-axial and relatively axially movable portions forming a chamber therebetween, each of said gear portions having a set of helical teeth co-axial with and sloping in a direction opposite to the corresponding helical teeth on the other of said portions such that during torque transmission by said gear the axial thrust on each said set of helical teeth urges its associated gear portion axially toward the other gear portion, each of said gear portions also having an annular surface facing a corresponding surface on the other of said portions, said annular surfaces forming the walls of a vent passageway for said chamber whereby the flow resistance of said passageway increases and decreases with movement of said gear portions toward and away from each other respectively; means for supplying a fluid under pressure to said chamber for urging said gear portions apart against said axial torque responsive thrusts during torque transmission; and means for measuring the pressure of the fluid supplied to said chamber.

5. In a transmission; a herringbone-type gear comprising hub means, a pair of co-axial rim portions and a pair of flexible web portions one for each of said rim portions and connecting its associated rim portion to said hub means, said web portions being spaced apart to form a chamber therebetween and said rim portions having facing surfaces forming the walls of a vent passageway for said chamber whereby the flow resistance of said passageway increases and decreases with movement of said rim portions toward and away from each other respectively, each of said rim portions having a set of helical teeth sloping in a direction opposite to the corresponding helical teeth on the other of said portions such that during torque transmission by said gear the axial thrust on each said set of helical teeth urges its associated rim portion axially toward the other rim portion; and means for supplying a fluid under pressure to said chamber for urging said rim portions apart against said axial torque responsive thrusts.

6. In a transmission; first and second herringbone-type gears disposed in meshing engagement and relatively rotatable for transmitting torque; one of said gears comprising a pair of co-axial and relatively axially movable toothed portions forming a chamber therebetween, each of said toothed portions having a set of helical teeth meshing with the other gear and sloping in a direction opposite to the corresponding helical teeth on the other of said portions such that during torque transmission by said gears the axial thrust on each set of helical teeth urges its associated toothed portion axially toward the other toothed portion, said toothed portions having adjacent surfaces forming the walls of a vent passageway for said chamber whereby the flow resistance of said vent passageway increases and decreases as said toothed portions move respectively toward and away from each other; means for supplying a fluid under pressure to said chamber for urging said toothed portions axially apart against said axial torque responsive thrusts during torque transmission; and means for measuring the pressure of the fluid supplied to said chamber.

7. In a transmission; first and second herringbone-type gears disposed in meshing engagement and relatively rotatable for transmitting torque; one of said gears comprising a pair of co-axial and relatively axially movable toothed portions forming a chamber therebetween, each of said toothed portions having a set of helical teeth meshing with the other gear and sloping in a direction opposite to the corresponding helical teeth on the other of said portions such that during torque transmission by said gears the axial thrust on each set of helical teeth urges its associated toothed portion axially toward the other toothed portions, there being a variable fluid passageway extending radially between said toothed portions in communication with said chamber and having its walls movable with said toothed portions into communication with said said passageway to control the pressure within said chamber; and means for supplying a fluid under pressure to said chamber for urging said toothed portions apart against said axial torque responsive thrusts on said toothed portions during torque transmission.

8. In a transmission; first and second herringbone-type gears disposed in meshing engagement and relatively rotatable for transmitting torque; one of said gears comprising a pair of co-axial and relatively axially movable toothed portions forming a chamber therebetween, each of said toothed portions having a set of helical teeth meshing with the other gear and sloping in a direction opposite to the corresponding helical teeth on the other of said portions such that during torque transmission by said gears the axial thrust on each set of helical teeth urges its associated toothed portion axially toward the other toothed portion, each of said toothed portions also having an annular surface facing a corresponding annular surface on the other of said portions, said annular surfaces forming the walls of a vent passageway for said chamber whereby the flow resistance of said passageway increases and decreases with movement of said toothed portions toward and away from each other respectively; and means for supplying a fluid under pressure to said chamber for urging said toothed portions apart against said axial torque responsive thrust during torque transmission.

References Cited in the file of this patent

UNITED STATES PATENTS

| Number | Name | Date |
|---|---|---|
| 1,165,830 | Alquist | Dec. 28, 1915 |
| 2,386,367 | Taylor | Oct. 9, 1945 |
| 2,444,363 | Newcomb | June 29, 1948 |